US006275814B1

(12) United States Patent
Giansante et al.

(10) Patent No.: US 6,275,814 B1
(45) Date of Patent: *Aug. 14, 2001

(54) INVESTMENT PORTFOLIO SELECTION SYSTEM AND METHOD

(75) Inventors: Joseph E. Giansante, Mountain View; Brian C. Dragun, El Granada, both of CA (US)

(73) Assignee: Investment Strategies Network, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/757,842

(22) Filed: Nov. 27, 1996

(51) Int. Cl.[7] .................................................. G06F 17/60
(52) U.S. Cl. ................................................. 705/36; 705/35
(58) Field of Search ..................................... 705/1, 35, 36

(56) References Cited

U.S. PATENT DOCUMENTS

| 4,346,442 |   | 8/1982  | Musmanno ........................ 364/408 |
|-----------|---|---------|------------------------------------------|
| 4,742,457 |   | 5/1988  | Leon et al. ........................ 364/408 |
| 4,823,265 |   | 4/1989  | Nelson ............................... 364/408 |
| 5,774,881 | * | 6/1998  | Friend et al. ....................... 705/36 |
| 5,784,696 | * | 7/1998  | Melnikoff ............................ 705/36 |
| 5,799,287 | * | 8/1998  | Dembo ................................. 705/36 |
| 5,806,047 | * | 9/1999  | Hackel et al. ....................... 705/36 |
| 5,806,048 | * | 9/1998  | Kiron et al. ......................... 705/36 |
| 5,806,049 | * | 9/1998  | Petruzzi ............................... 705/36 |
| 5,812,988 | * | 9/1998  | Sandretto ............................ 705/36 |
| 5,819,238 | * | 10/1998 | Fernholz .............................. 705/36 |
| 5,946,667 | * | 8/1999  | Tull, Jr. et al. .................... 705/36 |
| 5,999,918 | * | 12/1999 | Williams et al. ................... 705/36 |
| 6,003,018 | * | 12/1999 | Michaud et al. .................... 705/36 |
| 6,021,397 | * | 2/2000  | Jones et al. ......................... 705/36 |

FOREIGN PATENT DOCUMENTS 10-21294 * 1/1998 (JP) .
WO 96/06402 * 2/1996 (WO) .

OTHER PUBLICATIONS

Clarke et al: "Tracking errors, regret and tactical asset allocation"; Spring 1994, Journal of Portfolio Management, v20, n3, p. 16.*

Chow: "Portfolio selection based on return, risk, and relative performance"; Mar.–Apr. 1995, Financial Analysis Journal, v51, n2, pp. 54–60.*

Mellon Equity Associates: "Mellon Equity Associates, money manager, posts 1997 total assets managed of $11,312 mil"; Pensions & Investments, May 12, 1997, v25, n10, p. 81.*

Zhang: "Global asset allocation with multirisk considerations"; Fall 1998, Journal of Investing, v7, n3, pp. 7–14.*

"News & Comment", *BNA's Patent, Trademark & Copyright Journal,* vol. 49:325–326, Feb. 2, 1995 (citing Sage Products v. Devon Industries Inc., CAFC, No. 94–1274, Jan. 26, 1995).

* cited by examiner

*Primary Examiner*—Edward R. Cosimano
(74) *Attorney, Agent, or Firm*—Beck & Tysver, P.L.L.C

(57) ABSTRACT

A set of available investment assets is evaluated for inclusion in an efficient portfolio by treating certain asset characteristics as a probabilistic random variable, and averaging the resultant portfolios at each risk level. Next, each candidate portfolio at each risk level is modified to more nearly match a preset industry sector/investment style profile thus producing a well diversified efficient portfolio well matched to a user's desired risk level.

8 Claims, 4 Drawing Sheets

| ASSET | AMT |
|---|---|
| BARAX | 21.0% |
| BVALX | 0.0% |
| DNLDX | 12.8% |
| DODGX | .10.1% |
| HACAX | 0.0% |
| ⋮ | ⋮ |

―19

| ASSET | AMT |
|---|---|
| BARX | 23.1% |
| BVALX | 0.0% |
| DNLDX | 0.0% |
| DODGX | 14.9% |
| HACAX | 0.0% |
| ⋮ | ⋮ |

―17

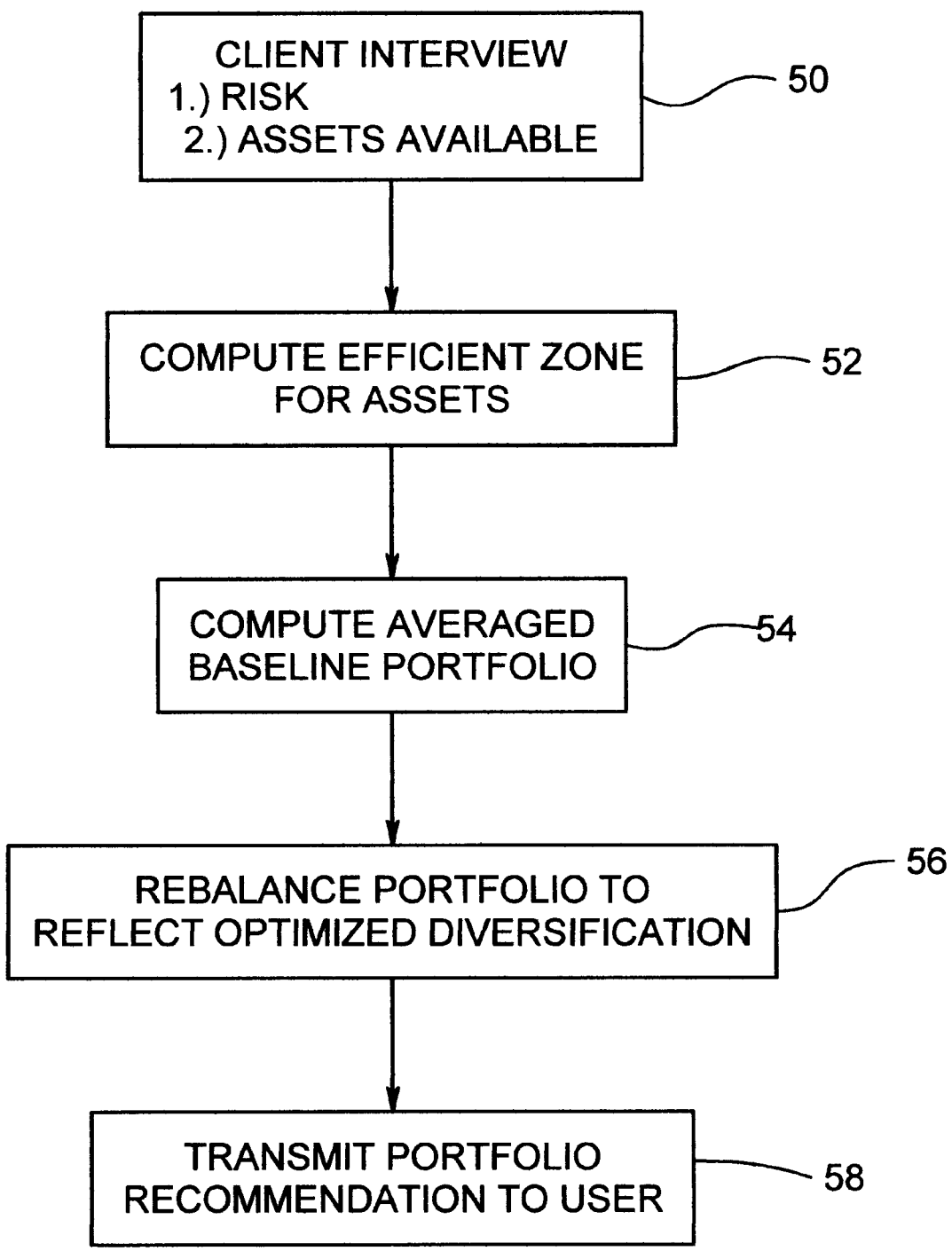

INVESTMENT PORTFOLIO SELECTION SYSTEM AND METHOD

FIELD OF THE INVENTION

The present invention relates generally to computer systems for providing information to a user. The system includes financial modeling techniques, and an automated system for interacting with a user for computing and supplying asset recommendations to the user.

BACKGROUND OF THE INVENTION

The 1990 Nobel Prize for Economics was awarded for work published in the 1950s on the "portfolio problem". The "portfolio problem" can be explained by considering two assets, A and B. Asset A has a particular risk and return associated with it. Asset B has a lower risk and a lower return. If an investor puts all his money into asset A he can expect the return and risk associated with the underlying asset. Similarly if he invests entirely in asset B he can expect the risk and return associated with that asset. However, what risk and return can be expected if he splits his investment between the two assets?

The return and risk of a portfolio containing both asset A and B is a function of the included assets but the relationship is not necessarily linear. In fact for most real world assets certain portfolios containing both asset A and asset B can exhibit a lower risk for a given return than either of the underlying assets. The benefit of this type of diversification follows from the fact that the financial performance of the two assets are not directly linked to each other and in general are imperfectly correlated. The optimal mix of asset A and asset B lies along a curve called the "efficient frontier". A methodology exists which can be used to compute the efficient frontier. The mathematics used to measure risk and return and to compute the frontier is discussed at length in numerous financial management textbooks, including Investments, authored by William F. Sharpe. However a brief explanation of the methods for measuring risk and return are useful to appreciate certain aspects of the present invention.

In general, each financial asset has an associated risk and a corresponding return which must be defined for purposes of computation. To compare two assets a standardized measure of risk and return must be developed. The texts define alpha, beta, market return and risk free return. Beta is a normalized measure of asset risk. An asset which "moves" exactly in proportion with the market has a beta of 1.0. An asset which moves only half as much as the market has a beta of 0.5. An asset which doesn't move at all has a beta of zero. Thus beta is a measure of the covariance of an asset's return compared with the market. Risk free return is the measure of return of a risk free investment such as U.S. treasury bills (beta=approximately 0.0). Return is defined as the percentage change in wealth over the holding period for the asset. Alpha is a measure of the amount by which the return on an asset exceeds the return of a market benchmark having the same level of risk as the asset. Many texts describe alpha as how "mispriced" an asset is. Values for alpha are expressed as a percent per time period.

It is well known that an "efficient" portfolio can be combined with a risk free investment to create an optimal portfolio at any defined level of risk. FIG. 1 sets forth these relationships in a graphical fashion.

An efficient portfolio calculator can compute the efficient frontier for a portfolio of assets if the expected future values of these parameters are known or estimated. However, these efficient frontier calculations are quite sensitive to the values of the expected return attributed to the assets, as well to their correlation or covariance.

For example, a problem directly associated with the conventional computation of optimal or efficient portfolios, is that an implicit choice is made between two assets having nearly identical risk but slightly differing returns. In this case, the classic computation will typically select the highest return asset only for inclusion in the portfolio, even though its expected return is not known with precision.

It is also important to note that traditional efficient frontier calculations ignore, or accommodate only in an indirect fashion, other differences among assets having similar return and covariance attributes. For example, the industry sector grouping, or investment style (e.g. growth versus value) of the assets is not directly considered in creating the portfolio. Using the traditional efficient frontier calculation, a portfolio could be selected which lacks appropriate industry sector or investment style diversification, and which ignores assets with excellent but slightly suboptimal average expected returns. All of these shortcomings are undesirable.

Thus a straightforward or obvious application of traditional portfolio theory to the selection of mutual funds to form properly risk-targeted, well-diversified investment portfolios is problematic.

SUMMARY OF THE INVENTION

As set forth above the classic computation of the efficient frontier treats the expected return of each of the assets as a constant. In the present invention conventional portfolio computations are modified to permit the consideration of assets exhibiting a statistical variation in the value of the expected investment return. This permits the consideration and construction of multiple portfolios which lie in an efficient "zone" rather than on a precise efficient frontier. The methodology further refines the selection by averaging the set of zone portfolios to create a set of weighted average portfolios. The set of average portfolios is a benchmark that may be further modified in the methodology. For example the portfolio can be adjusted to ensure that a final recommended portfolio matches certain preset criteria which is illustratively set forth as the industry sector diversification of the market itself.

Unlike classically computed efficient portfolios the present methods evaluate covariance, industry sector composition, and investment style (e.g. value versus growth, including P/E ratio and earnings growth rate) to compute portfolios which are not only very efficient, but are also appropriately diversified with respect to industry sector and investment style.

The preferred methodology of the present invention assumes an interaction with a user over a network such as the World Wide Web (WWW). For purposes of illustration the system and methodology is described in this Internet context with mutual funds as the only asset available for inclusion in the portfolio. It should be appreciated that other vehicles or techniques can be used to interact with users, and that other investment assets, such as individual stocks and bonds for example, can also be incorporated into the asset mix.

BRIEF DESCRIPTION OF THE DRAWINGS

The figures show an illustrative method and structures for carrying out the invention. Throughout the figures identical reference numerals represent identical or equivalent items, wherein.

FIG. 7 is a flowchart showing an interaction with a user.

DETAILED DESCRIPTION

Figure 1:
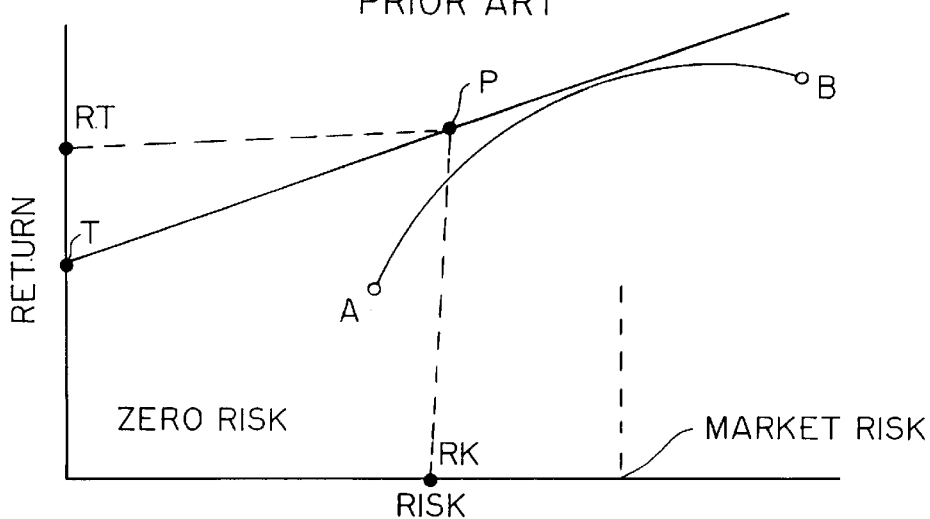
FIG. 1 shows a representation of the market line computation and the computation of an efficient portfolio as known from the prior art.

FIG. 1 shows a graphical representation of the prior art computation of an efficient set of portfolios based on two assets shown on the figure as point A and point B. This efficient set of portfolios can be combined with a risk free asset shown as point T to form a portfolio shown as point P which is made up from a mixture of asset A, asset B and asset T. This portfolio P has a risk shown as point RK and a return shown as point RT. Calculation of the frontier requires knowledge of the covariance matrix of the two assets, and an expected return for each asset. Most textbook presentations of this model use simple historical averages for each of these variables to compute the frontier. See for example Portfolio Selection by Harry M. Markowitz published by Yale University Press ISBN 0-300-01372-8 which is incorporated herein by reference, and note particularly the Appendix A which sets forth one technique for computing an efficient set.

Figure 2:
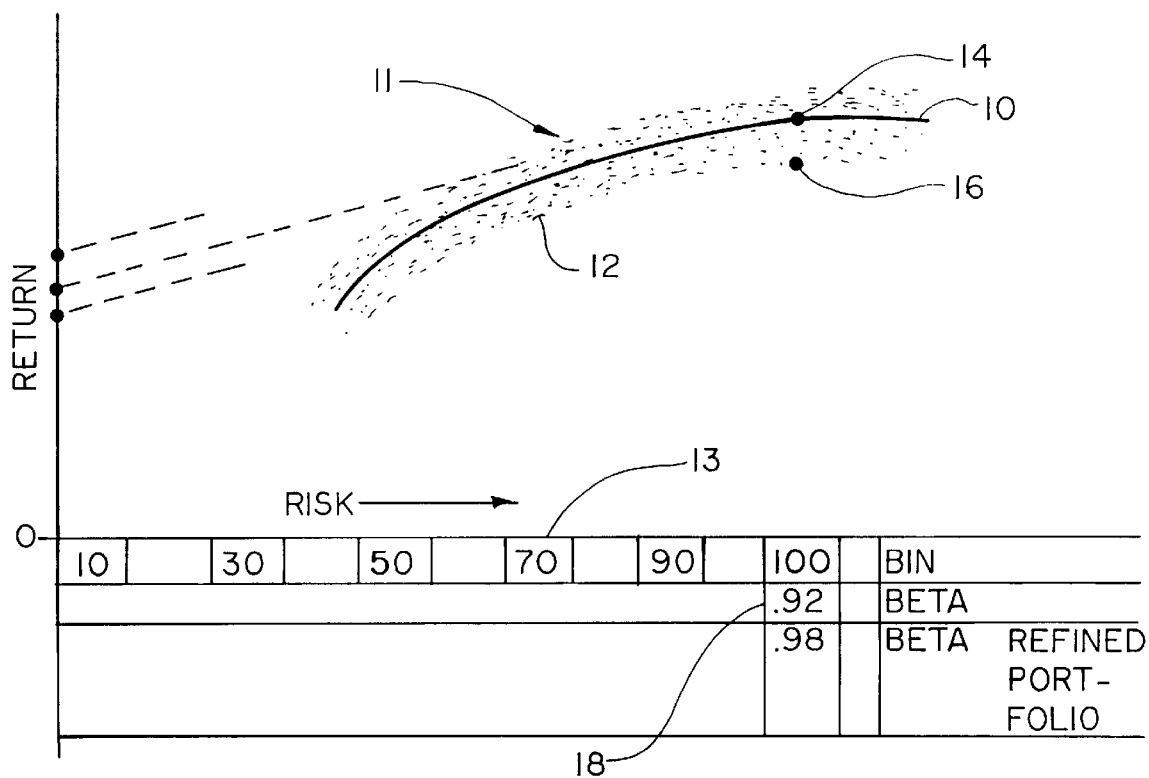
FIG. 2 is a graphical representation that results from an illustrative implementation of the process for carrying out the invention.

FIG. 2 is a graphical representation of an efficient frontier calculation in accordance with the invention, where certain of the input variables have been treated as a random probabilistic variables in a Monte Carlo simulation. Monte Carlo simulation techniques are well known throughout the computer industry and will not be further described. In this case, an index model is used to calculate a series of statistically valid expected returns for each asset. The current implementation of the invention uses a single index model incorporating alpha, beta, and the expected return on the market. It should be noted that multiple index models can also be used with the invention, and the covariances among the assets can also be treated similarly as random variables as well. By letting the alphas and betas and market returns vary statistically, and computing the efficient portfolio hundreds or thousands of times, a cloud of points 11 is produced typified by portfolio point 12. This cloud forms an "efficient zone" that can be averaged to create a set of baseline portfolios along line 10. It is important to note that this baseline set of portfolios line 10 is not necessarily the same as the classic efficient frontier. As seen in the figure, for any given risk level typified by risk bin 13 there are multiple portfolios that lie on or near the baseline portfolio line 10. These alternative portfolios have different assets in differing weights, based upon the constrained random simulation incorporating alpha, beta, and the expected market return. Several efficient frontier calculation methods are available for the basic components of this type of calculation, and both specialized applications and spreadsheets can be used to implement the invention. The baseline portfolio line 10 is used to seed another computational model to further refine investment selection. For example portfolio point 14 lies on the average line 10 and is used to seed another computation giving rise to point 16 below the average line 10, and at the same risk level as portfolio point 14. One example of this process is discussed in connection with FIG. 4 and FIG. 5.

Although treating each variable of the efficient frontier calculation as a statistically random variable is a useful way to model portfolios and to greatly enhance the value of the portfolios calculated, it is also possible to improve the method by making prospective extrapolations on the input variables, especially alpha.

Figure 3:
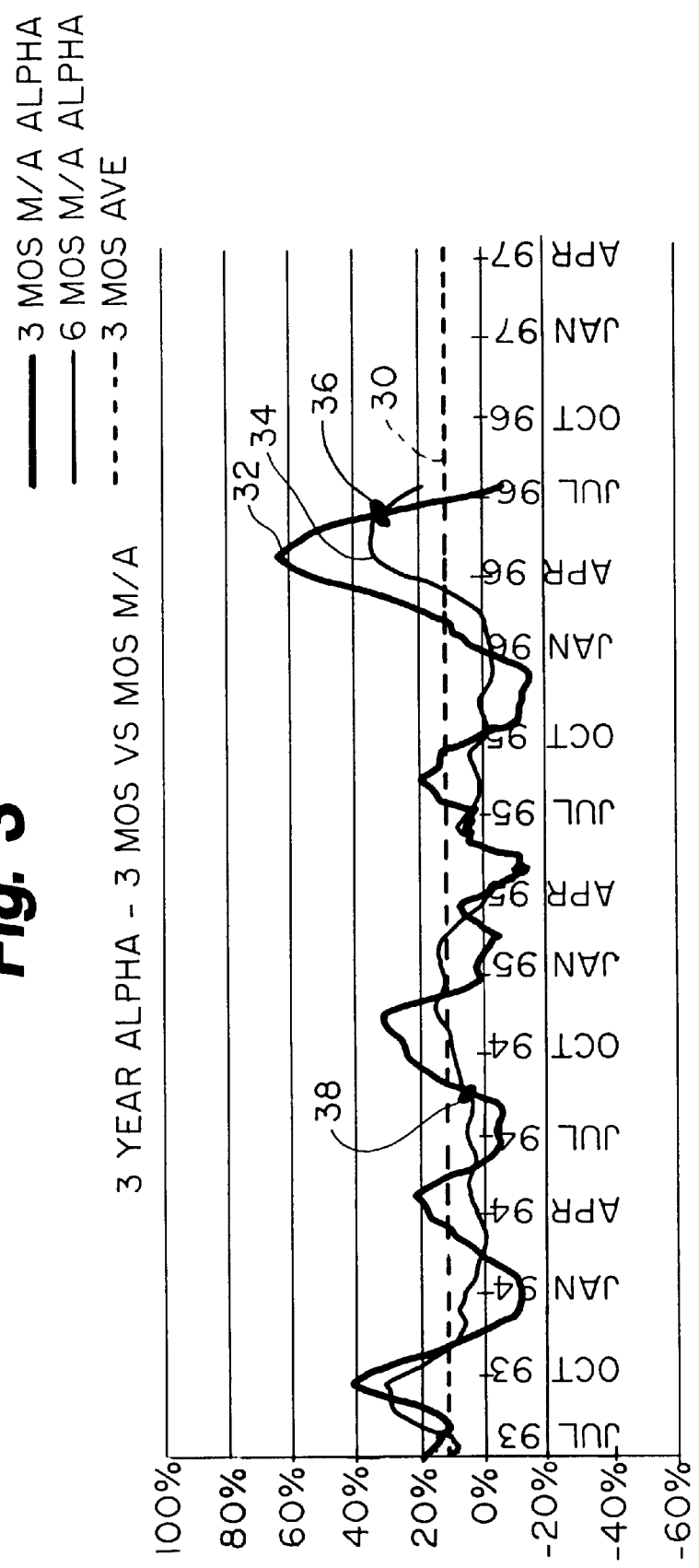
FIG. 3 is a plot of alpha for a single asset.

FIG. 3 is a chart displaying a time sequence of alpha values calculated for a single investment asset. The long term average value of alpha is shown as line 30 along with a 3 month moving average shown as line 32 and a six month moving average shown as line 34. It appears that at points on the graph where the 6 month moving average crosses the 3 month moving average alpha on the down slope (point 36) that the appropriate value of alpha for that asset should be lower than otherwise historically selected value. In a similar fashion if the 3 month and 6 month alphas cross on the upside (see point 38) then the appropriate value of alpha should be increased. This modification of alpha expectation or short term alpha prediction can improve the performance of the portfolios calculated to create the efficient zone 11 (see FIG. 1). This is just one of many methods for improving the near-term prediction of alpha. It should also be apparent that similar techniques can be used for the other input variables of the efficient frontier calculator without departing from the scope of the invention.

Figures 4, 5, 6:
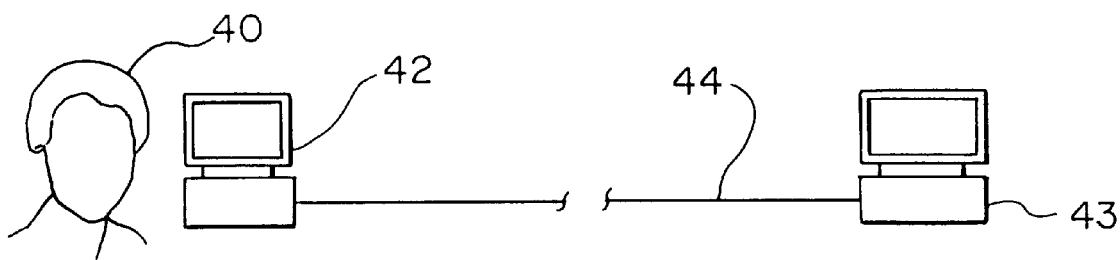
FIG. 4 is a table showing a portfolio computed from the efficient zone.
FIG. 5 is a table showing a portfolio computed from the efficient zone.
FIG. 6 is an illustrative network for interacting with a user.

FIG. 4 is a table which shows one efficient portfolio computed at the 100 percent market risk level on the average line 10 at point 14. The assets in this portfolio are partitioned by percentages and the beta for the overall portfolio is shown in the table 19 (corresponding to box 18 in FIG. 2). In general the computation will proceed to compute corner portfolios in the conventional fashion and calculate the portfolios at other risk levels from the corner portfolios. There are two aspects of this portfolio that can be noted and which are addressed by the methodology. First the portfolio beta for the portfolio of point 14, which has been generated as the results of the previously discussed Monte Carlo simulation, is only 0.92 and it should be closer to 1.0 given the position of the portfolio along the risk axis. Second, the assets present in the portfolio are not necessarily appropriately diversified across industry sectors and investment styles. For example the given portfolio may be over or under invested in one or more industry sectors. It is one aspect of this methodology to force the recommended portfolio composition to reflect a preset or predefined industry sector and/or investment style profile. In the present implementation of the methodology the recommended portfolio is forced to more nearly match the industry sector diversification of the overall market itself. This may be accomplished in one of several ways including the use of the solver function of the Excel spreadsheet. In general a statistically efficient portfolio, for example the portfolio of point 14, is used to seed a solver spreadsheet which has industry sector and investment style diversification parameters set forth. The spreadsheet attempts to reallocate percentages of the investment assets to fit the portfolio within the desired diversification profiles, while at the same time maintaining the desired risk level and beta, as well as maximizing the expected return on the entire portfolio.

FIG. 5 is an example of a rebalanced portfolio shown as a table 17 which corresponds to the point 16 on FIG. 2. This portfolio in general has most or all of the same assets as the point 14 portfolio but alters the amounts to more nearly reflect the industry sector diversification of the market itself, or another pre-defined sector diversification profile.

The methodology described above can be used in a variety of ways. However it is expected that the intensive research and computation required to carry out the invention makes a network based implementation most advantageous. FIG. 6 shows a user 40 operating a computer 42 coupled to a remote computer 43 over a network 44. Such a network-based implementation also enables the user to interact in real time with the process, modifying assumptions (e.g. desired risk, sector/style balance, and expected market return), and receiving a revised portfolio to reflect these changes. The preferred approach is set forth in the flow chart of FIG. 7 which starts with a client interview at block 50. The client interview asks questions which permit the appropriate selection of a risk bin for the client at an appropriate position along the risk axis. The client interview also determines which assets are available to the user for inclusion into portfolios. From the perspective of the invention it is important to note that all the funds or other assets are treated according to a uniform methodology to rank the funds with respect to investment style, diversification, beta, and P/E. The actual methodology used for the initial screening is less significant than the fact that all funds are treated the same. This involves a subjective selection of candidate mutual funds from the existing collection of over 6,000 mutual funds. This winnowing or screening process is automated to ensure that the selected set of mutual funds reflect those options which are available to the investor, e.g. in a 401 (k) retirement plan. Various subjective factors are evaluated as well. In general fund manager tenure and experience is evaluated. The size of the fund, expenses, its industry sector diversification and past performance versus risk incurred are all evaluated. The selection process reduces the candidate set of funds to approximately fifty to one hundred funds.

Next this set of funds is examined in detail. The alphas and betas are computed for these funds, based upon publicly available information. These computations are automated and are used to assign a return and a risk to each asset, which are then used in the modified Efficient Frontier simulation of FIG. 2. This portion of the process occurs in block 52. In block 54 the average portfolio used to seed the optimization process is formed as illustrated in FIG. 4.

In block 56 the optimization of portfolios across industry sectors and investment style are built for each of several defined risk levels and mutual fund programs. The user is then served with a recommended list of mutual funds which lie on or near the efficient frontier and are appropriately diversified across industry sectors and investment styles in block 58.

In use a user 40 may operate a network computer 42 having a browser application running. The user 40 is interrogated to determine the users perceptions and tolerance of risk in investment decisions. For example, the age of the investor and the investor's goals are evaluated. In this step the range of selectable assets is determined. For example the user or investor may have a 401 (k) retirement plan which allows the user to select between several funds within a fixed family of funds. This step can be performed face to face in the form of an interview, however it is preferable to collect this data on-line and interactively through a web site. The interview results in a placement of the user in a risk bin along the risk axis of FIG. 2 and further collects an exhaustive list of all assets that the user can buy. From the list of funds available to the user certain qualitative and quantitative data are collected and/or calculated at network computer 43 or computing machine according to the process shown in FIG. 7.

Although the present invention has used mutual funds as representative assets it should be clear that other asset types may be substituted. It is also important to recognize that the alpha prediction methodology can be accomplished in a variety of ways that fall within the scope of the invention. It should also be clear that the predictive methodology for beta and market return can be altered without departing from the scope of the invention.

We claim:

1. A process for selecting an investment portfolio with the aid of a computing machine comprising the steps of:
   a) selecting an initial set of assets;
   b) predicting a value for alpha for each asset defining a parameter;
   c) computing with a computer, a standard deviation of each alpha for each candidate asset defining a parameter;
   d) computing with a computer a standard deviation of each beta for each candidate asset defining a parameter;
   e) positing a market return for the market as a whole, and computing a standard deviation of the market return for a holding period defining a parameter;
   f) computing with a computer the expected return of each asset over the holding period defining a parameter;
   g) computing with a computer the covariance matrix of the assets defining a parameter;
   h) applying the parameters to an efficient frontier calculator, to determine a set of corner portfolios based upon at least one of said parameters being treated as a random variable;
   i) constructing a market line using the corner portfolio and the risk free asset;
   j) identifying an average efficient portfolio for each of the multiple risk levels defined along the a risk axis, by specifying the weights of assets within each of said portfolios.

2. The process of claim 1 further comprising the step:
   k) adjusting the weights of the assets in each efficient portfolio to optimize the level of industry sector and investment style diversification in the portfolio, so as to maintain the portfolio at a position on or near the efficient frontier and at the desired risk level.

3. The process of claim 1 wherein:
   step b) is performed by comparing a relatively current alpha for each asset with a historical alpha for each asset and reviewing the short term versus long term alpha relationship to generate, and assign an expected alpha for each of said candidate assests.

4. A process for selecting an investment portfolio comprising the steps of:
   a) interviewing a user through a local client software application to select an initial set of funds based upon criteria, wherein at least one criteria is selected from the set of;
      i) industry sector;
      ii) investment style;
      iii) P/E ratio;
      iv) earnings growth rate
      v) fund manager tenure and experience;
      vi) fund size;
      vii) fund expenses;
      viii) recent risk-adjusted performance
   b) comparing a first current alpha for each fund with a historical alpha for each fund and determine the short term versus long term alpha relationship to generate a set of candidate funds, and assigning an expected alpha for each of said candidate funds;

c) computing a standard deviation of each alpha for each candidate fund;

d) computing a standard deviation of each beta for each candidate fund;

e) positing a market return and computing a standard deviation of the market return for a holding period;

f) computing the expected return of each fund over the holding period;

g) computing the covariance matrix of the assets;

h) applying the parameters to an efficient frontier calculator, to determine a set of corner portfolios based upon said parameters being treated as probabilistic random variables;

i) constructing a market line using the corner portfolio and the risk free asset;

j) identifying an efficient portfolio for multiple risk levels defined along the risk axis k) adjusting the weights of the funds in each efficient portfolio to optimize the level of industry sector and investment style diversification in the portfolio, whereby the portfolio is maintain the portfolio at a position on or near the efficient frontier and at the desired risk level.

5. A process for selecting an investment portfolio for an investor comprising the steps of:

identifying a risk level for the investor, expressed in relation to market risk;

selecting an initial set of assets available to the investor for investment based upon at least the criteria of,
industry sector;
recent risk-adjusted performance;

computing and comparing a recent alpha for each asset with a historical alpha for each asset and comparing the short term versus long term alpha relationship to generate a set of candidate assets, and assigning an expected alpha for each of said candidate assets;

computing a standard deviation of each alpha for each candidate asset;

computing a standard deviation of each beta for each candidate asset;

positing a market return as a random variable and computing a standard deviation of the market return for a holding period;

computing the expected return of each asset over the holding period;

computing with an efficient frontier calculator, a set of corner portfolios based upon said parameters being treated as random variables to approximate observed real world returns;

constructing a market line using the corner portfolio and the risk free asset;

identifying an efficient portfolio at the risk level identified for the investor;

adjusting the weights of the assets in the efficient portfolio to optimize the level of industry sector and diversification in the portfolio, while maintaining the portfolio on or near the efficient frontier at the desired risk level.

6. A system for providing real time interactive investment advice to a user (40) comprising:

a network (44) including a computer (42) for use by a user (40) and a remote computer (43);

a client interview process (50) for selecting a set of assets available for investment, and for determining the appropriate risk level for the user;

a process (52) for computing a set of efficient portfolios for the assets;

a process (54) for computing average baseline portfolios for the assets; a process (56) for re balancing said set of portfolios to include assets in pre-defined industry sectors generating a portfolio with a risk value near said efficient portfolio;

a process for transmitting portfolio recommendations to said user (40).

7. The system of claim 6 wherein said client interview process (50) includes interrogation of users age, investor goals, and assets available for investment in a risk bin classification (13) for the user.

8. The system of claim 6 wherein process for re balancing includes selecting a less efficient portfolio (16) with approximately the same risk level of a more efficient portfolio (14) when said less efficient portfolio (16) exhibits more sector diversification, for presentation to said user (40).

* * * * *